United States Patent [19]

Parker et al.

[11] 4,341,984
[45] Jul. 27, 1982

[54] ELECTRONIC COMMUTATION FOR DIRECT CURRENT ELECTRIC MOTORS

[75] Inventors: Louis W. Parker, 2040 N. Dixie Hwy., Ft. Lauderdale; Rhey W. Hedges, Ft. Lauderdale, Fla.

[73] Assignee: Louis W. Parker, Ft. Lauderdale, Fla.

[21] Appl. No.: 149,816

[22] Filed: May 15, 1980

[51] Int. Cl.³ ............................................. H02K 29/00
[52] U.S. Cl. .................................... 318/138; 318/254; 318/439
[58] Field of Search ......................... 318/138, 254, 439

[56] References Cited

U.S. PATENT DOCUMENTS

| | | | |
|---|---|---|---|
| 3,419,782 | 12/1968 | Sheldrake et al. | 321/5 |
| 3,453,512 | 8/1969 | Polakowski | 318/138 |
| 3,483,458 | 12/1969 | Kirk | 318/254 |
| 3,594,624 | 7/1971 | Lueder | 318/254 |
| 4,095,148 | 6/1978 | Parker | 318/138 |

Primary Examiner—J. V. Truhe
Assistant Examiner—S. Bergmann
Attorney, Agent, or Firm—Pollock, VandeSande & Priddy

[57] ABSTRACT

A Direct Current electric motor comprises a stator consisting of a plurality of coils interconnected to one another, and a plurality of gate controlled solid state rectifiers responsive to forced commutation below a particular rpm and self-commutation above said rpm which are connected to the junctions of the coils for selectively conducting current into and out of the stator coil junctions in dependence upon which of said rectifiers is rendered operative. This produces a plurality of stator poles which are angularly displaced from the poles of the rotor of the motor and which shift in position as the rotor rotates. A plurality of trigger assemblies are provided for controlling the energization of the various gate electrodes, each of said trigger assemblies comprising a pick-up coil which forms a portion of a frequency selective circuit whose resonance frequency varies in dependence on the position of a magnetic element that is moved relative to the pick-up coils as the rotor rotates. A sine wave oscillator is coupled to the frequency selective circuits in the trigger assemblies, the oscillator being operative to produce either of two different output frequencies, and an electronic switch responsive to the speed of rotation of the rotor selectively changes the output frequency of the oscillator. One of these frequencies induces trigger assembly operation at all rotor positions and advanced SCR trigger timing for reliable starting and very low speed operation. The other frequency retards SCR trigger timing for most efficient motor running at moderate and high speeds.

35 Claims, 6 Drawing Figures

ELECTRONIC COMMUTATION FOR DIRECT CURRENT ELECTRIC MOTORS

BACKGROUND OF THE INVENTION

The present invention comprises an improvement in the subject matter described in Parker U.S. Pat. No. 4,095,148 issued June 13, 1978, for "Direct Current Motors". The Parker patent relates to a DC motor using silicon controlled rectifiers in place of the brushes and commutator which are conventionally employed in such a motor, and includes a mechanical commutator and associated brushes which are used to connect a low voltage and current to activate the silicon controlled rectifiers. The present invention replaces these low current and voltage components of the Parker arrangement by small rotating stacks of laminated iron and low power electronic circuits, said circuits being so arranged that they are capable of starting the motor from a standing position and introduce commutation assistance during motor starting and at very low speeds thereby eliminating various special starting circuits which are employed in the Parker arrangement to start the motor.

The improved Direct Current motor of the present invention is primarily intended for use in electric motor vehicles.

An object of the present invention is to eliminate the mechanical brush-commutator SCR trigger means employed in the aforementioned Parker patent by employing contactless electronic circuit means in place thereof.

Another object of the present invention is to provide a nonmechanical arrangement responsive to a particular rpm that is adapted to advance or retard the magnetic position of the rotor with respect to the stator, thereby to alter the time at which the SCRs are triggered on in accordance with motor speed.

An additional object of the present invention is to provide an arrangement which insures that SCR triggers will be available for motor starting at any rotor position.

Yet another object of the present invention is to provide an arrangement whereby a triggered assembly inhibits simultaneous SCR trigger generation by a particular adjacent trigger assembly.

A further object of the present invention is to provide stator SCR commutation assistance during motor starting and very low speed operation, which automatically ceases above a particular speed.

SUMMARY OF THE INVENTION

In accordance with the present invention, the motor construction shown in Parker U.S. Pat. No. 4,095,148, the disclosure of which is incorporated herein by reference, is modified in various respects to accomplish the foregoing objects and advantages. As in the Parker patent, the motor comprises a stator having a plurality of coils which, in the preferred embodiment of the invention, are connected in series with one another in a closed loop configuration, means being provided to connect the junction between adjacent pairs of the coils to diametrically opposed ones of said junctions in said closed loop configuration. A plurality of pairs of oppositely poled solid state gate controlled rectifiers, preferably silicon controlled rectifiers (hereinafter referred to as SCRs) are connected respectively to the junctions of different adjacent pairs of the coils for selectively conducting current into and out of the stator coil junctions. A current source is provided to energize each of the pairs of silicon controlled rectifiers, and means including a distributor driven by the motor rotor are provided for energizing the gate electrodes of different ones of the silicon controlled rectifiers in sequence thereby to produce a plurality of stator poles which are angularly displaced from the rotor poles and which stator poles shift in position about said closed loop stator coil configuration with rotation of the rotor.

In accordance with the present invention, the brush-commutator arrangement which is used in the Parker patent to effect energization of the gates of the several SCRs is replaced by a plurality of trigger assemblies that are connected respectively to different ones of the SCRs. Each of said trigger assemblies includes a pick-up coil whose inductance is selectively varied by an element of magnetic material that moves past the pick-up coil in each trigger assembly as the rotor rotates. The several pick-up coils are mounted in spaced relation to one another along an arcuate path which is concentric with the path of movement of the magnetic element, and each pick-up coil is connected to one or more impedance elements, preferably by capacitor means, to form a frequency sensitive circuit in each trigger assembly whose resonance condition varies as a function of rotor position. Oscillator means are coupled to the frequency sensitive elements in all of the trigger assemblies, the oscillator means being operative to produce at least two different output frequencies, and the actual output frequency which is produced by the oscillator means at any given time is controlled by an rpm responsive electronic switch so that the output frequency produced by the oscillator means at any given time is dependent upon the motor operating condition, i.e., whether the motor is stopped or running.

As a result of this arrangement, the rotor position at which a particular amplitude of the output signal is produced by each of said frequency selective circuits is jointly dependent upon the particular frequency of said oscillator and the position of the magnetic element relative to each of the pick-up coils in the several trigger assemblies as the rotor rotates. This aspect of the arrangement non-mechanically advances or retards the rotor's mechanical position at which said trigger assemblies are activated. Circuit means, preferably comprising a Schmitt trigger circuit whose input is connected to the frequency selective circuit in each trigger assembly and whose output is connected to a gate trigger amplifier in said assembly, is responsive to a particular amplitude threshold of output signal which is produced by the frequency selective circuit in said trigger assembly to selectively energize the gate electrodes of the SCRs that are associated with said trigger assembly. The trigger assemblies are operative to trigger on their associated SCRs in a predetermined sequence as the rotor rotates.

In accordance with a further feature of the invention, the several trigger assemblies are so arranged that each trigger assembly, when rendered operative, provides a feedback signal to an adjacent trigger assembly to inhibit the operation of the previously operable adjacent trigger assembly, thereby to assure that, at each rotor position where simultaneous SCR triggers could otherwise be produced, SCR triggers are actually produced by only a particular one of said adjacent trigger assemblies.

In accordance with another feature of this invention, SCR commutation assistance is automatically started or stopped at a particular rpm by an arrangement that is synchronized by SCR triggering and provides electronically delayed, forced commutation near rotor positions of natural commutation. As a result of this arrangement, a heavily loaded motor will reliably start in any rotor position and produce very high torque at very low speeds of, for example, two or three rpm as well as at all higher speeds.

BRIEF DESCRIPTION OF THE DRAWINGS

The foregoing construction and operation of the present invention will become more readily apparent from the following description and accompanying drawings in which.

DESCRIPTION OF THE PREFERRED EMBODIMENTS

Figures 1, 2:
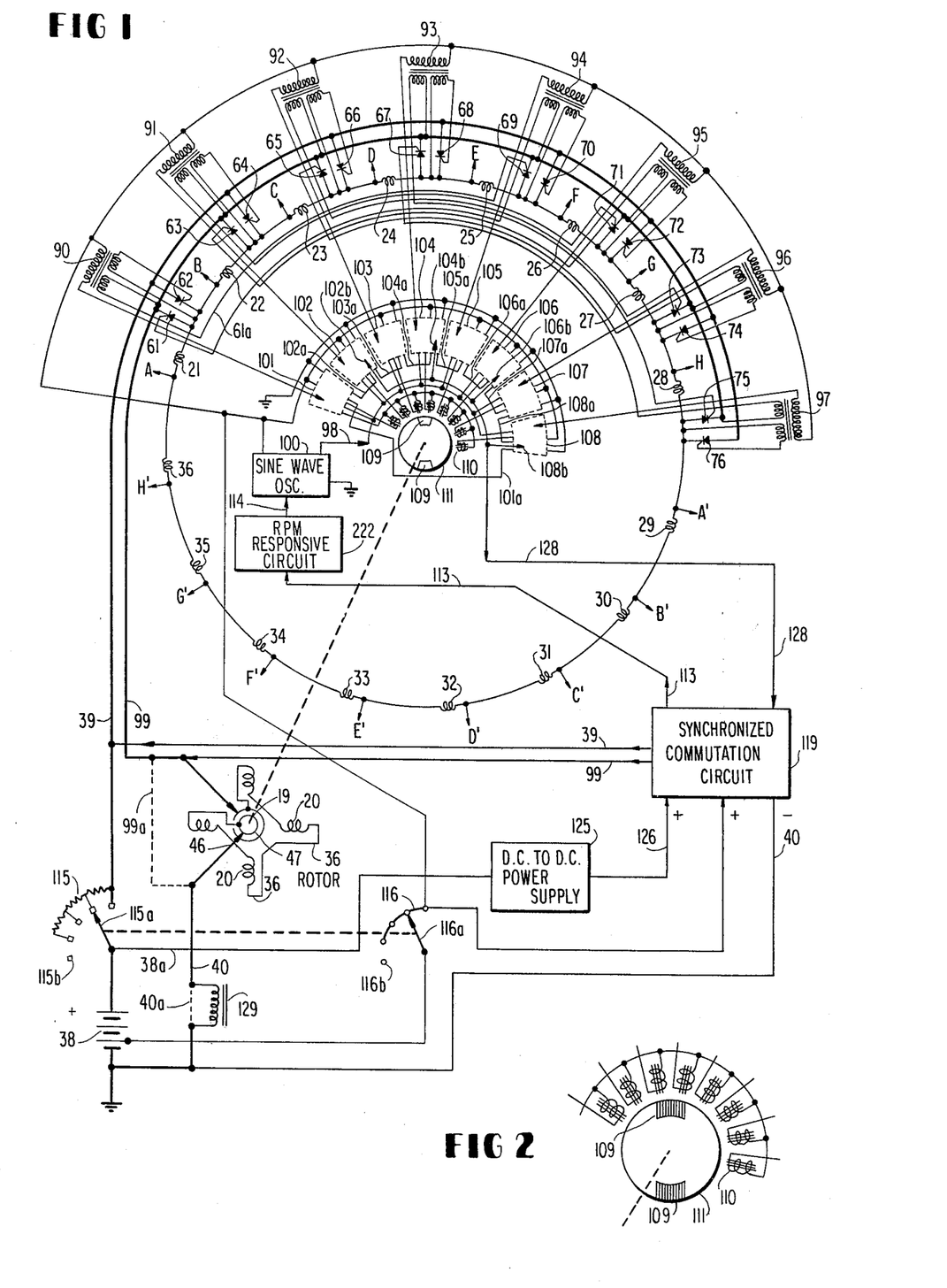
FIG. 1 illustrates in schematic form a motor constructed in accordance with the present invention.
FIG. 2 is an enlarged view of the portion of FIG. 1 which shows the electromagnetic portion of the distributor arrangement employed to activate the proper SCRs.

FIG. 1 depicts a motor arrangement which is generally similar, both structurally and operationally, to the motor arrangement which is described in Parker U.S. Pat. No. 4,095,148, and the disclosure in said patent is accordingly incorporated herein by reference for a full discussion of the construction and operation of said motor arrangement. The reference numerals employed in FIG. 1 are the same as those utilized in FIG. 1 of the said Parker patent to the extent that said reference numerals identify like components, and additional components shown in FIG. 1 of the instant application are identified by reference numerals other than those employed in FIG. 1 of the Parker patent.

Briefly, the motor comprises a stator consisting of plurality of stator coils 21 through 36 connected in series with one another in a closed loop configuration. Connections, designated by the terminals A–H inclusive and A'–H' inclusive, are brought out from the junction between each adjacent pair of coils, the connections A–H being located on one half of the stator coil array and the connections A'–H' being located on the other half of the array. Junctions having the same letters are interconnected to one another, i.e., junction A is connected to A', etc., but these connections have not been shown in FIG. 1 in order to simplify the drawing. The positive terminal of a direct current power supply 38 is connected to the opposite ends of a diameter of the coil circle, and the negative terminal of the power supply 38 is connected to the ends of a second diameter on the coil circle which second diameter is located at right angles to the first diameter, with the result that four poles are formed on the stator which interact with four poles on an associated rotor 36, and which are angularly displaced therefrom, to create a torque therebetween.

The rotor 36 comprises four coils 20 which are connected in series with one another between slip rings 19 and 47, and said slip rings are in turn interconnected to the power supply via lines 40 and 99 to effect energization of the rotor coils thereby to produce the rotor poles which coact with the stator poles.

The circuit further includes a plurality of silicon controlled rectifiers 61–76 grouped in oppositely poled pairs and connected as shown to the aforementioned stator coil junctions, to effect a current flow both into and out of each coil junction at appropriate times in the manner and for the purposes described in the aforementioned Parker patent. The control electrodes of the 16 SCRs are operated respectively by 16 separate secondary windings provided on eight transformers 90–97. One side of the primary windings of said transformers are interconnected to one another, and the other sides of the said primary windings of transformers 90–97 are individually connected to SCR gate trigger assemblies 101 through 108 in the manner shown in the drawings. Rotation of the rotor 36 operates to energize the gate electrodes of different ones of the silicon controlled rectifiers in sequence thereby to produce a plurality of stator poles which are angularly displaced from the rotor poles, and which shift in position about the closed loop coil configuration as the rotor rotates.

In the Parker patent, rotation of the rotor 36 effected the aforementioned SCR gate control operation by means of a commutator that was driven by the rotor, and brushes that rode on said commutator. In accordance with the present invention, however, the commutator and associated brushes are replaced by an armature 111 which rotates with rotor 36, and which includes two stacks of laminations 109 fabricated of a magnetic material and located 180° apart as shown in FIGS. 1 and 2, and eight identical pick-up coils 110 are mounted on centers spaced 22.5° apart concentrically around the outer circumference of armature 111. Said coils 110 and stacks 109, in cooperation with associated resistive and capacitive elements, function as an electromagnetically activated rotor position responsive arrangement which, in further cooperation with low power electronic circuits and gate controlled solid state rectifiers, comprise a novel contactless input power distributor means which accomplishes the purpose of the mechanical brush/commutator arrangement used in the aforementioned Parker patent or other such arrangements that have been used in the prior art for the energization and commutation of high power DC motors.

More particularly, the eight pick-up coils 110 are connected respectively to eight identical SCR trigger assemblies 101 through 108, each of which comprises a circuit of the type to be described hereinafter in reference to FIG. 3; and the several trigger assemblies 101 through 108 are associated with a variable frequency sine wave oscillator 100 that is adapted to provide either of two different output frequencies under the control of an rpm responsive switching circuit 222 which is activated by a portion of commutation circuit 119. It should be understood that the use of a two frequency oscillator and eight trigger assemblies is intended to be illustrative only. The actual number of frequency steps between a higher and lower frequency provided by oscillator 100 may be more than two, and the actual number of trigger assemblies employed can be either higher or lower than eight.

Inasmuch as the motor is described as it may be applied to a motor vehicle, the speed of the motor can be varied by varying the magnitude of the voltage which is fed thereto, e.g., by means such as a rheostat 115. Arm 115a is connected in series with the positive side of the power supply 38, as illustrated in FIG. 1, and an associated connector is provided on the other side of said power supply 38 comprising a switch arm 116a which is ganged to arm 115a and movable along an arcuate conductor 116. When the switch arms 115a, 116a are in their extreme counterclockwise positions, in engagement with terminals 115b and 116b respectively, the motor is not energized and does not rotate, but as the arms 115a, 116a are moved clockwise to the successive positions indicated in the drawings, oscillator 100 and all the control circuits connected thereto are energized and increasing voltage levels are supplied to the motor to cause the motor to run at increasing speeds. When the motor arrangement of FIG. 1 is used in an electric vehicle, which is one of the applications for the motor system described in the aforementioned Parker patent, the position of the ganged arms 115a, 116a can be controlled by a foot pedal in the vehicle. However, it will be understood that the motor system can be employed in other applications as well, and that the voltage supplied to the motor can be controlled in other fashions.

In motor vehicle applications, the series motor as described has the advantage of high torque at low and high speeds. In other applications where constant speed is required, shunt connection of the field windings is possible. In such cases, an inductance coil may replace the series field as will be described later.

Figure 3:
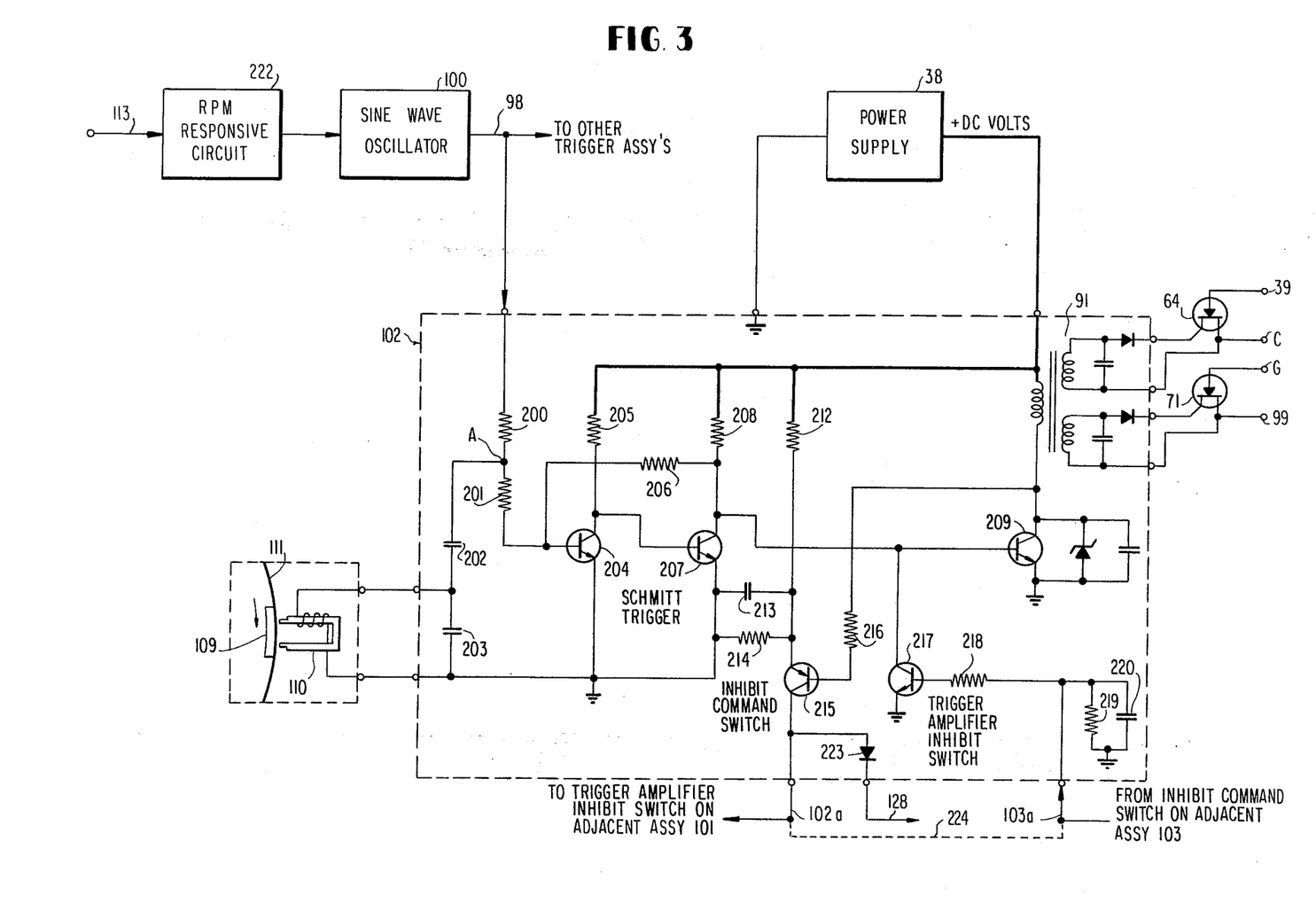
FIG. 3 is a schematic drawing of a typical one of the SCR trigger assemblies employed in the arrangement of FIG. 1.

FIG. 3 is a schematic drawing of a typical one of the SCR trigger assemblies 102, it being understood that the same circuit is employed for each of the other assemblies 101 through 108, and depicts one of the induction pick-up coils 110 which is associated with said trigger assembly 102, as well as a portion of armature 111 and one of the sets of laminations 109 which is mounted on said armature and which moves past each of the induction coils 110 in sequence as the motor rotor 36 is rotated. Trigger assembly 102 is, as shown in each of FIGS. 1 and 3, employed to control the energization of the primary winding of transformer 91, the secondary windings of which in turn control the energization of the gate electrodes of SCRs 64 and 71 to effect the stator current flows which are described in the Parker patent when said two SCRs are rendered conductive. Each of the other trigger assemblies shown in FIG. 1 is used to control an associated other one of said transformer primary windings, to control in turn the conduction of two other ones of said SCRs, all as described in the Parker patent. The various primary windings are connected to the power supply 38 as shown in each of FIGS. 1 and 3 and, in addition, the sine wave oscillator 100 is coupled to each of the trigger assemblies 101–108 via line 98, as also shown in FIGS. 1 and 3.

Oscillator 100 is adapted to provide either of two output frequencies. The frequencies are comparatively close to one another, and may comprise for example the frequencies 10 Kc and 13 Kc. The particular frequency which is provided by the oscillator under any given operating condition is determined by an rpm responsive circuit 222 shown schematically in FIG. 6, and in block form in FIGS. 1 and 3.

The arrangement of circuit 222 provides solid-state switching that alters the output frequecies of oscillator 100 between the starting frequency (e.g., 13 Kc) and the second, lower running frequency (e.g., 10 Kc) at predetermined rotor speeds. More specifically, circuit 222 responds to rotation derived signals coupled from commutation circuit 119 via line 113 (as shown on FIG. 1) which ultimately cause a particular transistor to switch on and off at predetermined rpms. In other words, circuit 222 electronically performs speed-related switching similar to that of mechanical centrifugal switch means.

Figure 5:
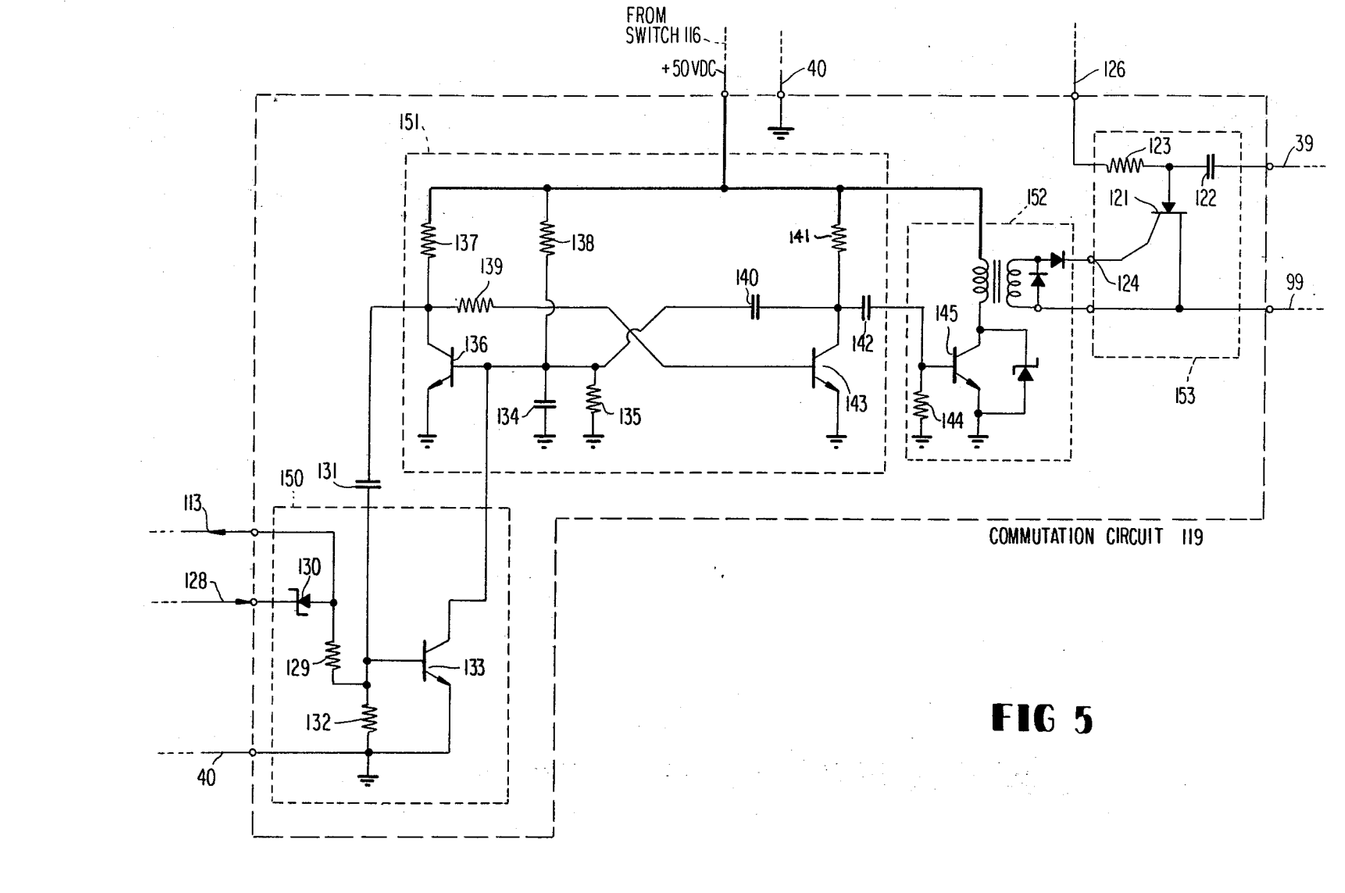
FIG. 5 is a schematic drawing of a commutation assistance circuit whose operation is commanded by particular action of the trigger assemblies exemplified by FIG. 3.

Referring to FIG. 5, it will be noted that line 113 connects to the junction of zener diode 130 and resistor 129. The signals coupled to this junction are described later in connection with the operation of commutation circuit 119. It is sufficient here to note that the first few pulses out of a group of pulses generated by each SCR trigger assembly in response to rotor rotation are coupled by zener diode 130 to line 113. The time between said groups of pulses is inversely proportional to rotor speed. In other words, as rotor speed increases, the time between the start of succeeding trigger assembly pulse groups decreases and vice-versa. Because each trigger assembly is turned on twice during a 360° rotor revolution, line 113 couples 16 pulse groups per revolution to the input of circuit 222, the first pulse in said groups being respectively displaced in time from one another in accordance with rotor rpm.

Figure 6:
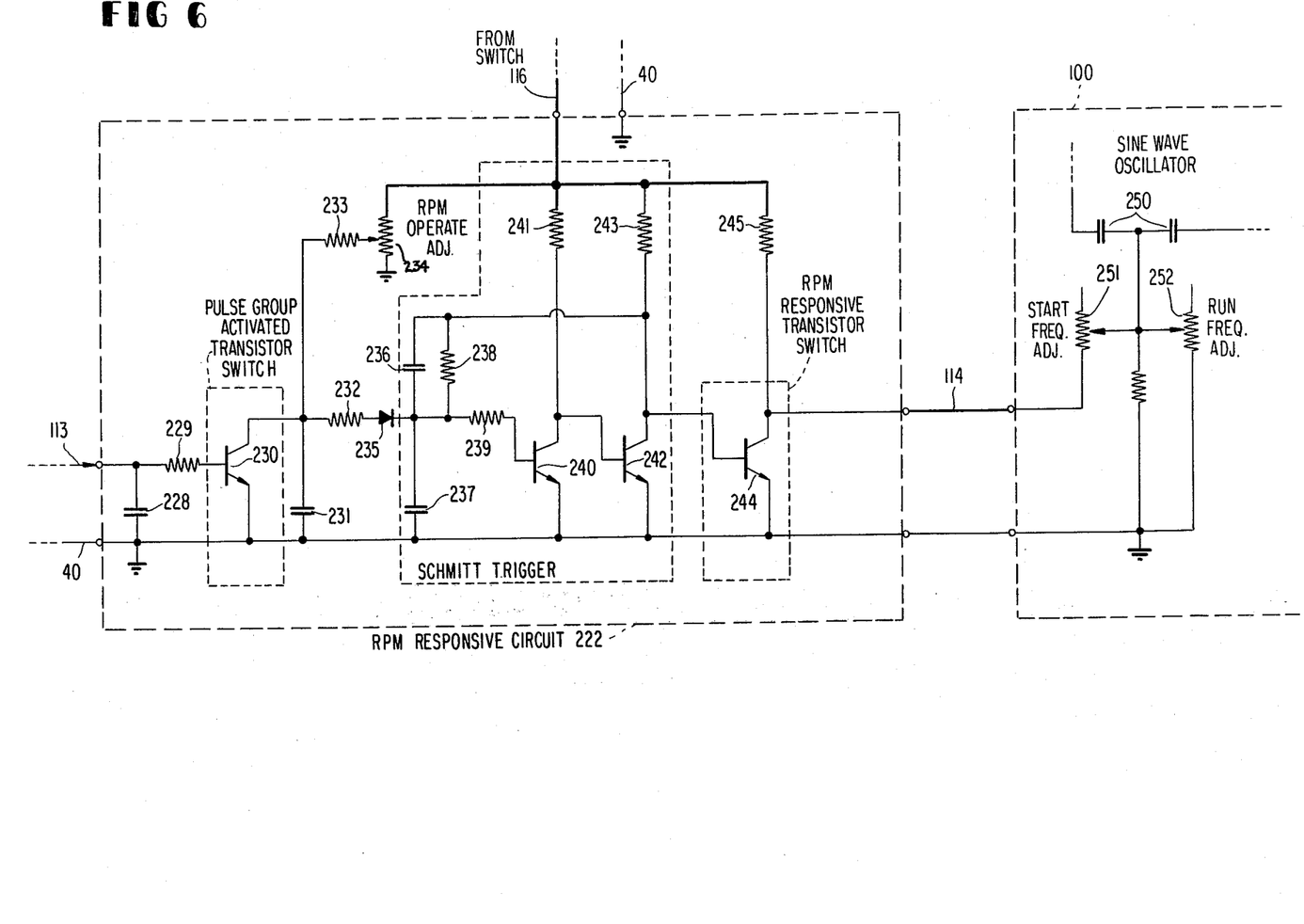
FIG. 6 is a schematic diagram of an rpm responsive circuit that contactlessly switches the frequency of the oscillator at predetermined motor speeds.

FIG. 6 comprises a schematic diagram of circuit 222. Some of the frequency determining components of oscillator 100, i.e., capacitors 250 and potentiometers 251 and 252, are also shown in FIG. 6. Circuit 222 consists of a transistor switch 244 that turns on and off in response to Schmitt trigger transistors 240 and 242 which respond to the integrated result of transistor 230 switching that is caused by said rpm related signals coupled to the base electrode of transistor 230 by line 113.

When the motor is stopped, no signals appear on line 113 and transistor 230, having no other source of forward bias, is off. Under this condition, capacitor 231, connected between the collector of transistor 230 and ground charges to a positive voltage determined by a resistor 233, the position of the movable contact on an rpm operate adjust potentiometer 234, and the base electrode input circuit of transistor 240. More specifically, with the motor stopped and transistor 230 off, positive voltage is coupled from the power supply via potentiometer 234 and resistor 233 through resistor 232 and diode 235 to the junction of resistors 238, 239 and capacitors 236, 237. When said junction voltage is approximately +0.7 v or higher, forward bias is provided to transistor 240 through resistor 239, and to transistor 244 through resistor 238. This causes transistor 240 to conduct, which cuts off transistor 242 and allows additional forward bias to be coupled to the base of transistor 244 from the positive side of the power supply through resistor 243. This added bias assures more rapid turn on and saturation of switch transistor 244. Line 114, shown connected between the collector of transistor 244 and one end of start frequency adjust potentiometer 251 of oscillator 100, is thus switched to ground by collector-emitter conduction of transistor 244. When transistor 244 is off and line 114 is ungrounded, the operating frequency of oscillator 100 is adjusted by the setting of run frequency potentiometer 252 alone. However, when line 114 is grounded by conduction of transistor 244, the frequency of oscillator 100 shifts to a higher frequency determined by the setting of start frequency potentiometer 251. Thus, when the motor is stopped, circuit 222 establishes a condition whereby oscillator 100 is caused to operate at the higher start frequency.

Assume now that the motor is running at 120 rpm and potentiometer 234 is adjusted to activate circuit 222 during acceleration at, for example, 200 rpm. The pulse groups on line 113 would now be appearing at a rate of 32 groups per second. The action of capacitor 228 and resistor 229 integrate the few pulses in each group to a single continuous pulse. Transistor 230 is thus caused to conduct for a single period (of approximately 400 microseconds) each time an SCR trigger assembly is first activated. During said conduction of transistor 230, the junction of resistors 233, 232 and capacitor 231 is clamped to near ground potential and positive voltage ceases to be coupled from the positive side of the power supply to the input circuit of transistor 240. Under this condition, the positive charge on capacitors 237 and 236 begins discharging through resistors 238 and 239, thereby maintaining conduction of transistor 240. When transistor 230 ceases conduction, capacitor 231 again charges through resistor 233 and ultimately positive voltage is again coupled through resistor 232 and diode 235, whereby capacitors 236 and 237 cease discharging and begin charging toward a higher magnitude.

It can now be seen that when the motor is running, the peak voltage to which capacitor 231 can charge is also dependent upon the rate at which transistor 230 is switched on and off as well as the adjustment of potentiometer 234. Further, it should be noted that variations in the voltage charge of capacitors 236 and 237 are now dependent upon both the peak and the average charge realized by capacitor 231. Under the present assumed adjustment of potentiometer 234, the average charge of capacitors 236 and 237 will continuously maintain transistor 240 conduction, and oscillator 100 will continue to operate at the start frequency.

Assume now that the motor is caused to accelerate. The average charge on capacitors 236 and 237 will begin decreasing further in response to the decreased peak and average charge of capacitor 231 resulting from the increased rate at which transistor 230 is caused to switch by the signals on line 113. Ultimately, capacitors 236 and 237 will discharge below the threshold required to sustain the forward bias to transistors 240 and 244 as the motor continues to accelerate. For purposes of description, it was previously assumed that the adjustment of potentiometer 234 causes said lack of forward bias to occur at 200 rpm.

At 200 rpm, therefore, transistor 240 ceases conduction, which action allows forward bias to be supplied through resistor 241 to transistor 242 causing it to begin conducting. Collector-emitter conduction of transistor 242 clamps the junction of resistors 238, 243, capacitor 236 and the base electrode of transistor 244 to near ground potential. The inter-connection of capacitor 236 and resistor 238 between transistors 240 and 242 is of known Schmitt trigger form, and provides positive feedback that accelerates the switching action of said transistors. Thus, when transistor 240 conduction begins to slowly decrease at 200 rpm, said Schmitt trigger arrangement accelerates this action causing transistor 244 to be abruptly cut off by conduction of transistor 242, and line 114, which had been grounded, is thereby abruptly open-circuited. With line 114 ungrounded, the frequency of oscillator 100 is dependent solely upon run frequency adjust potentiometer 252 shown permanently grounded. Thus, when the motor speed reaches 200 rpm, circuit 222 establishes a condition whereby oscillator 100 is caused to operate at the lower run frequency.

Assume now that the motor is caused to decelerate from a speed of 200 rpm or greater for any reason, e.g., an increasing load or a decrease in input voltage. The arrangement of circuit 222, by design, switches at a lower rpm when decelerating than when accelerating. More particularly, the average charge on capacitor 231 must be of a different magnitude to cause transistor 240 to begin conducting than to cause transistor 240 to cease conduction. For this reason, the switching action of circuit 222 is reliably positive during acceleration or deceleration and is not subject to oscillation in the rpm region of switching even when the motor slowly reaches or leaves the specific rotor speed at which switching occurs.

The above described switching at different magnitudes of input threshold is typical of normal Schmitt trigger operation and is further exaggerated in the specific arrangement of circuit 222 by resistor 232 and capacitor 236. When, for example, the motor is decelerating toward an rpm for switching, conduction of transistor 242 effectively connects one end of capacitor 236 and resistor 238 to ground through its collector-emitter junction, and said components are thereby effectively placed in parallel with capacitor 231 through diode 235 and resistor 232. The voltage on capacitor 231 is thus divided to a lower voltage by action of resistors 232 and 238 and the input charging time constant is increased by paralleling capacitor 237 with capacitor 236. The average charge on capacitor 231 must, therefore, reach a different magnitude to induce Schmitt trigger switching action during deceleration than when resistor 238 and capacitor 236 are not paralleled with capacitor 237 by conduction of transistor 242 (as is the case when the motor is accelerating toward an rpm for switching). When the motor has slowed sufficiently to raise the average voltage on capacitor 231 to the threshold where Schmitt trigger action occurs, transistor 244 is driven to saturation conduction by the combined forward bias previously described when transistor 242 is cut off. This action again grounds line 114 causing oscillator 100 to operate at the higher start frequency where improved commutation of stator SCRs is achieved at very low rotor rpm.

The above described switching of circuit 222 cooperates with other portions of the present invention to advance the time at which SCR pairs are triggered on during motor starting and in accordance with a particular motor rpm when the motor is decelerating from all higher speeds. In other words, the contactless distributor arrangement of the present invention electronically alters the rotor mechanical position where stator energization and commutation occurs as a function of the output frequency of oscillator 100, which frequency, in turn, is shifted by circuit 222 in dependence upon whether the motor is stopped or running and, when running, in accordance with particular rpms.

Referring now to FIG. 3, it will be noted that the pick-up coil 110 which is associated with typical trigger assembly 102 is connected to a pair of capacitors 202 and 203 forming a portion of the trigger assembly 102, to provide a frequency selective network which is connected via resistor 200 to the output of oscillator 100. Briefly, this arrangement provides either little attenuation of the output signal frequencies of oscillator 100, or substantial attenuation of a frequency spectrum which includes said frequencies, in dependence upon the mechanical position of laminations 109. More particularly, the reactive elements at the input to typical trigger assembly 102 offer little attenuation of the output signals from oscillator 100 when laminations 109 are in proximity to the coil 110 associated with said trigger assembly. Simultaneously, the same elements of the other trigger assemblies provide substantial attenuation of said signals because laminations 109 are, at that moment, remote from their respective coils 110.

The junction of resistor 200 and capacitor 202 (point A in FIG. 3) is connected by means of a resistor 201 to the base of a transistor 204, which is in turn connected to a transistor 207 and to the various resistors 205, 206 and 208 in a configuration which constitutes a well-known Schmitt trigger circuit. In the particular position of laminations 109 relative to pick-up coil 110 shown in FIG. 3, transistor 204 is caused to conduct by positive alternations of the sine wave signal coupled from the output of oscillator 100 to the base of transistor 204 via resistors 200 and 201. The particular amplitude of the signal which is supplied to the base of transistor 204 at any given time is determined by the rotor position, resistor 200, and the aforementioned frequency selective network consisting of capacitors 202, 203 and the inductance of coil 110.

Stacked laminations 109, more clearly shown in FIG. 2, rotate with the rotor and increase the Q and the inductance of coil 110 when said laminations are in close proximity to the coil. As a result, and in response to rotor movement, the arrangement of resistors 200, 201 and the said frequency selective network comprise an attenuator, variable in both bandwidth and magnitude of attenuation, which is interposed between oscillator 100 and the input to transistor 204. More specifically, the aformentioned resistance and capacitance elements cooperate with the inductance and Q of coil 110, which vary in dependence upon the mechanical position of laminations 109, to provide an AC signal attenuator of variable selectivity and variable attenuation over a relatively broad frequency spectrum. The signal pass to attenuate ratio is equal to the ratio between the impedances realized by said reactive elements in a low Q state of active series resonance and a higher Q state of active parallel resonance in response to the position of laminations 109 and the continuous output signal from oscillator 100. Thus, a substantially greater signal pass to attenuate ratio is realized by the particular arrangement of resistive and reactive elements than may be achieved with the Q merit of said reactive elements in a single state of resonance.

The above described electromagnetic portion of the contactless distributor employed in the present invention, i.e., said frequency selective variable attenuator network, is substantially immune to extraneous noise energy and achieves substantial immunity to the variously coupled noise impulses that are generated by the switching of adjacent high power SCRs. This is because the coil elements 110 of all of said networks are maintained in a condition of active (i.e., signal driven) resonance by every frequency output of oscillator 100. In addition, said networks are caused to be naturally immune to SCR trigger impulse noise because said triggers are generated by the same output signal of oscillator 100, and impulse noise therefore occurs at the particular frequency to which all said networks are tuned at any given moment. In other words, when no output is desired from particular ones of said networks they are maintained in a signal driven state of low impedance series resonance by the output signal of oscillator 100 at the same frequency at which SCR triggers are being generated by the activated trigger assembly (whose frequency selective network, at that moment, is actively parallel resonated by said oscillator 100 output signal). Thus, the particular arrangement of each frequency selective network employed in the system of the present invention (1) attenuates the output signal from oscillator 100 and further employs said signal to improve its noise immunity by a state of active, broadband series resonance when laminations 109 are remote from coil 110, (2) passes the output signal from oscillator 100 with noise rejecting narrower bandwidth in a state of active parallel resonance when laminations 109 are in proximity to coil 110, and (3) functions ultimately as a variable impedance whose magnitude is a function of the position of laminations 109 relative to coil 110. The amplitude of the signal coupled from oscillator 100 to transistor 204 is varied by the voltage divider action of resistor 200 and the said frequency selective network. Resistor 201 is provided to raise the effective input impedance of transistor 204.

Considering now the general operation of the typical frequency selective netowrk shown in FIG. 3, the value of capacitor 202 is selected to be such that, when laminations 109 are remote from coil 110, capacitor 202 and coil 110 are near series resonance at either of the aforementioned two output frequencies of oscillator 100. This is possible only because the bandpass of series resonating coil 110 and capacitor 202 is broadened by the de-Qing effect of series resistor 200 and is further broadened by the fact that, when laminations 109 are remote from coil 110, the Q of coil 110 is lower than when it is in proximity thereto. For example, the frequency selective networks of a contactless distributor constructed in accordance with the present invention, exhibited a typical 6 DB bandpass of approximately 10 Khz at series resonance when the laminations 109 were remote from coil 110, and a 6 DB bandpass of 2.5 Khz at parallel resonance when the laminations 109 were in proximity to coil 110. Under the condition of operation when laminations 109 are remote from coil 110, the bandpass of the resonant circuit is broad, its impedance is low, and the attenuation of the variable impedance network, therefore, is high. As a result, the amplitude of the signal coupled from point A by resistor 201 at any frequency of oscillator 100 is less than the +0.7 v conduction threshold of transistor 204. Since transistor 204 has no other source of forward bias, it does not conduct under this condition of operation and no SCR triggers are produced by the trigger assembly 102.

The value of capacitor 203 is selected to be such that, as laminations 109 are moved by rotation of the rotor to a position wherein said laminations partially overlap coil 110, capacitor 203 and the increased inductance and Q of coil 110 achieves parallel resonance with substantially narrower bandpass at the higher of the two frequencies from oscillator 100. When the laminations 109 completely overlap coil 110 due to continued rotation of the rotor (this being the particular relative positions of the components shown in FIG. 3) resonance and said Q increase occurs at the lower of the two output frequencies from oscillator 100. This operation will be described in greater detail subsequently in reference to FIG. 4. When the frequency selective circuit is near parallel resonance, its impedance increases and there is a decrease in the attenuation by said voltage divider action of the output signal from oscillator 100. Consequently, the amplitude of the signal coupled to transistor 204 by resistor 201 rises above +0.7 v causing transistor 204 to conduct. Conduction of transistor 204 is a prerequisite to the production of SCR triggers by trigger assembly 102, and therefore SCR triggers may be produced only when the armature 111 connected to rotor 36 is in a physical position such that laminations 109 induce parallel or near parallel resonance of coil 110 and its associated capacitor 203.

As mentioned previously, transistor 204, in association with transistor 207 and resistors 205, 206 and 208, form a Schmitt trigger circuit the operation of which is well known in the art. One aspect of the operation of such a trigger circuit is that, because of the positive feedback between the output and input of the circuit, a Schmitt trigger is caused to exhibit a minimum output pulse width when a sine wave of varying amplitude is coupled to its input. Said positive feedback causes the first transistor to turn off at a lower input voltage level than is required to turn said transistor on. The parameter values of the various circuit components employed in each typical trigger assembly of the present invention are so selected that the minimum output pulse width at the collector of transistor 207 exceeds the minimum requirement for reliable SCR triggering any time transistor 204 is brought to even momentary conduction. This insures reliable SCR turn on even though the sine wave amplitude coupled to the input of transistor 204 varies widely and rapidly in response to rotor movement, and may therefore exceed a conduction threshold for less than, for example, two microseconds.

The collector of transistor 207 is connected to the base of transistor 209 which serves as an SCR gate trigger amplifier. As a result, the voltage pulses produced at the collector of transistor 207 in response to rotor position are converted to current pulses suitable for SCR turn on by action of transistor 209 and transformer 91 the primary of which, as shown in FIG. 3, is connected between power supply 38 and said transistor 209.

Figure 4:
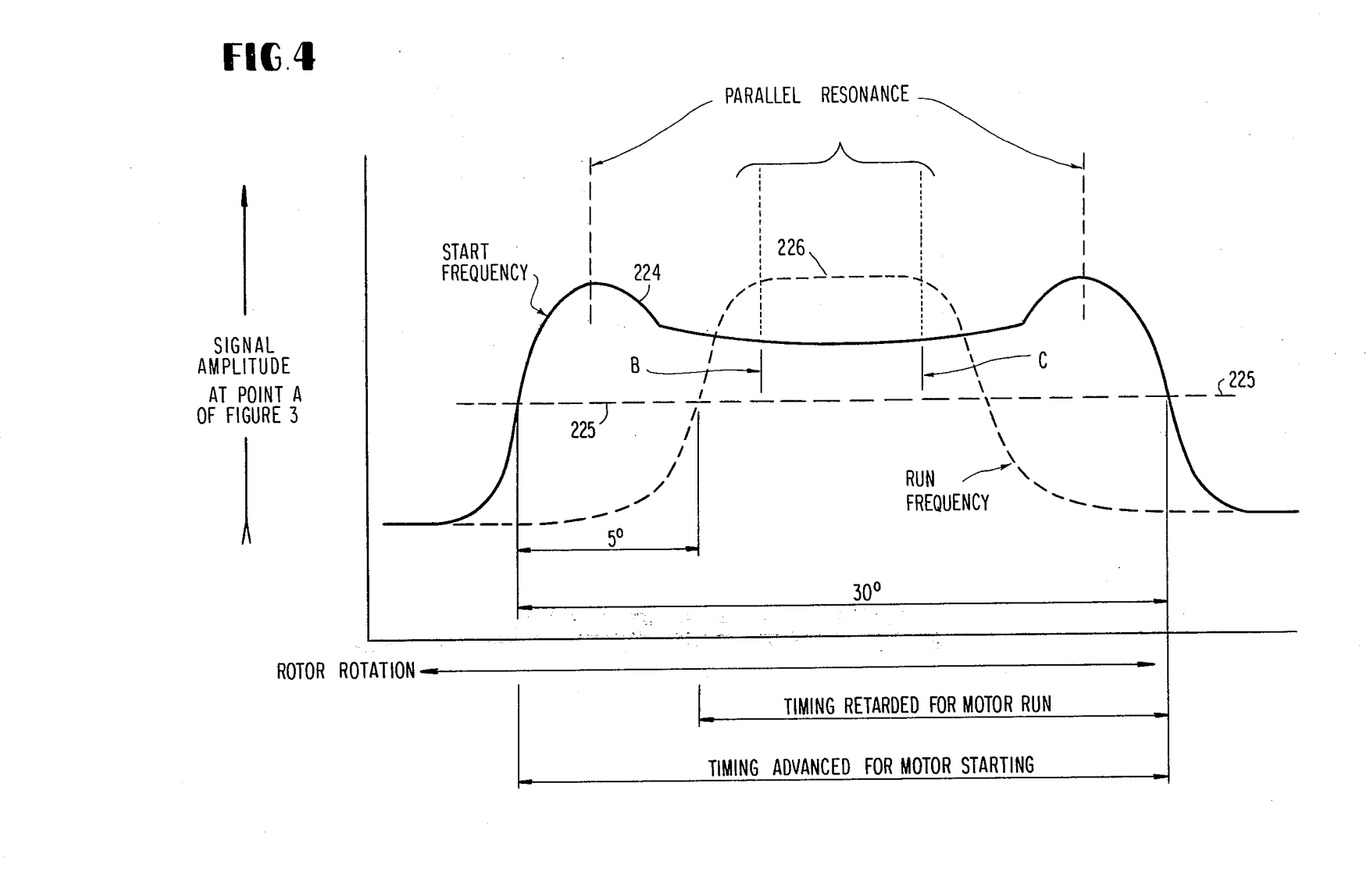
FIG. 4 graphically depicts the signal amplitude variations which are produced at point A of the trigger assembly shown in FIG. 3 as the motor rotor rotates.

As noted previously, the improvement of the present invention electronically advances or retards the apparent mechanical position of the rotor relative to the stator at which SCR triggers are first produced. This aspect of the invention will become most readily apparent by consideration of FIG. 4 which graphically illustrates the signal amplitude variations at point A of FIG. 3 in terms of rotor position, and the particular frequency which is being produced by oscillator 100 in dependence upon the operating condition of the motor. As mentioned previously, oscillator 100 is caused to operate at a first frequency, e.g., 13 Kc when the motor is in its starting mode of operation (this condition being designated by the curve 224 "start frequency" in FIG. 4), and is switched by rpm responsive circuit 222 to produce a lower frequency output when the motor is in its running mode of operation (to produce the condition depicted by curve 226 designated "run frequency" in FIG. 4). The graphical representations in FIG. 4 illustrate the signal amplitude variations at point A of FIG. 3 for these start and run frequencies as a lamination stack 109 approaches, partially overlaps, fully overlaps, and then partially overlaps and moves away from a given pick-up coil 110. The line 225 represents the signal level constituting the turn-on threshold for transistor 204, i.e., the minimum signal amplitude which must be present at point A before SCR triggers may be produced by operation of the trigger assembly 102.

In the particular example of the present invention illustrated in FIGS. 1 and 2, the several coils 110 are located on centers spaced 22.5° apart, and the angular designations shown in FIG. 4 are based on this assumed spacing. In addition, inasmuch as the several coils 110 extend over an arc of 180°, and the armature 111 has two diametrically opposed segments 109 of magnetic material, and, as shown in each of FIGS. 1 and 2, each segment 109 extends over an arc which is greater than the arcuate extent of any individual coil 110, a segment 109 will necessarily be in at least partially overlapping relation to at least one of the coils 110 when the motor is stopped, regardless of the angular position of the rotor at that time. The curves 224 and 226 of FIG. 4 depict the signal amplitude which may be present at point A in the trigger assembly associated with that one of coils 110. The region between points B and C in FIG. 4 represents that portion of the rotation wherein the coil 110 in question exhibits maximum inductance due to full overlap of the segment 109 with said coil 110.

With the motor in its stopped condition, or in its starting mode, the oscillator 100 produces the aforementioned start frequency, and the amplitude of the signal 224 at point A rises above the transistor 204 conduction threshold (line 225) for approximately 30° of the rotation of the segment 109 past coil 110 inasmuch as resonance occurs before a given set of laminations 109 increases the inductance of coil 110 to a maximum level. In other words, the effect of laminations 109 overlaps adjacent coils 110. This eliminates the possibility of the motor not starting because segment 109 was stopped between two coils 110.

When the run frequency of oscillator 100 is selected by rpm responsive circuit 222, however, parallel resonance is achieved only when laminations 109 increase the inductance of coil 110 to its maximum value and, as a result, and as depicted by curve 226 in FIG. 4, for this running mode of operation the signal at point A rises above the conduction threshold (line 225) for transistor 204 for substantially less than 30° rotation. At run frequency, the resonance effect of laminations 109 cannot overlap adjacent coils 110 at any rotor position.

It will be further noted from FIG. 4 that the rotor position at which the signal amplitude at point A first rises above the threshold line 225 when the oscillator 100 is producing the motor start frequency (line 224) occurs approximately 5° earlier in the rotation than when the oscillator 100 is operating to produce the motor run frequency (line 226). As a result, the particular physical position of the rotor with respect to the stator at which transistor 204 first conducts is jointly dependent upon both the rotor position and the particular output frequency of the oscillator, said frequency being determined by the speed of rotation of the rotor. Thus, by appropriate choice of the start and run frequencies, the rotor/stator mechanical positions at which particular stator coils are energized by SCR conduction may first be optimized for a motor starting condition, and then shifted electronically for optimum motor running conditions, without any actual movement of pick-up coils 110.

Inasmuch as the angular extent of a given set of laminations 109 is sufficiently large to overlap more than one of the pick-up coils 110, it is necessary to provide means which will assure that, regardless of rotor position, and regardless of the fact that the frequency sensitive circuits in more than one of the trigger assemblies 101–108 may be near parallel resonance due to the fact that their respective coils 110 are in joint proximity to laminations 109 when the motor is stopped or in its starting mode, only one of the trigger assemblies will operate to produce SCR triggers to only one pair of SCRs in the starting mode. This is accomplished in the present invention by the provision of the transistors 215 and 217, and their associated components, in each trigger assembly.

Transistor 217 comprises a trigger amplifier inhibit switch, and has its collector connected to the base of transistor 209 and its emitter connected to ground. When a voltage equal to or greater than +0.7 v is coupled to the base of transistor 217 by resistor 218, transistor 217 will conduct thereby to effectively connect the base of transistor 209 to ground, and this effectively inhibits SCR trigger outputs from transformer 91 even though transistor 204 is caused to conduct by the frequency selective attenuator and rotor action described previously. Transistor 215, operating as an inhibit command switch, has its emitter connected to the positive side of power supply 38 through a resistor 212, its base connected through resistor 216 to the collector of transistor 209, and its collector connected via line 102a to the trigger assembly inhibit switch (corresponding to transistor 217) in the adjacent trigger assembly 101.

The input to trigger amplifier inhibit switch 217 in SCR trigger assembly 102 is connected to the inhibit command switch (corresponding to transistor 215) in the other adjacent trigger assembly 103 via line 103a. Thus, when SCR gate trigger pulses are induced in trigger assembly 103, the inhibit command switch transistor (corresponding to transistor 215) in said adjacent assembly 103 couples corresponding positive voltage pulses to assembly 102 via line 103a. These pulses charge a capacitor 220 and are coupled to the base of transistor 217 by resistor 218. When said pulses are present, transistor 217 conducts to inhibit operation of gate trigger amplifier transistor 209. During the interval between pulses on line 103a, capacitor 220 slowly discharges to ground through resistor 219, and through resistor 218 and the base-emitter junction of transistor 217. Capacitor 220 holds transistor 217 at conduction until its charge falls below approximately +0.8 volts. The discharge time constant is designed to be longer than the interval between pulses.

By reason of the foregoing circuit configuration, when SCR gate trigger pulses are developed by assembly 103, assembly 102 SCR gate triggers are inhibited by reason of the conduction of transistor 217 in assembly 102 in response to the pulses which are fed from assembly 103 to assembly 102 on line 103a, i.e., when assembly 103 is actively producing SCR gate trigger pulses, assembly 102 is inhibited from producing SCR trigger pulses by reason of the feedback from assembly 103 to assembly 102. Likewise, when assembly 102 (shown in FIG. 3) is producing SCR trigger pulses, its inhibit command switch transistor 215 couples corresponding positive pulses via line 102a to the trigger amplifier inhibit switch in assembly 101, thereby inhibiting SCR trigger pulses from trigger assembly 101.

The foregoing feedback arrangement between adjacent trigger assemblies is present throughout all of the SCR trigger assemblies 101 through 108. Therefore, when oscillator 100 is operating to produce the start frequency, and the rotor position of the motor is such that parallel resonance is induced on adjacent assemblies by overlapping proximity of laminations 109 to the coils 110 of said adjacent assemblies, one pair of SCRs will always receive gate triggers regardless of rotor position, and only said one pair of SCRs will receive such gate triggers until the rotor position has been changed sufficiently to effect operation of the next adjacent trigger assembly which operation, in turn, will inhibit production of gate trigger pulses from the trigger assembly that had previously produced such pulses.

For reasons previously explained, the motor will commence rotation in any rotor position. However, because self-commutation of stator SCRs does not occur below particular rotor speeds, commutation assistance is provided during motor starting and below said particular rotor speeds. Said particular speeds have been determined to be proportional to the mechanical load of the moment imposed upon the motor. More specifically, the greater the magnitude of motor load, the faster the rotor must rotate to provide reliable self-commutation. It has been determined, for example, that with a stator winding constructed in accordance with Parker U.S. Pat. No. 4,095,148 a rotor speed of 50 rpm or greater must be maintained for reliable self-commutation with a load of 100 ft. lbs.

Briefly, the method employed in commutation assistance uses a charged capacitor that is switched in reverse polarity across the stator assembly when the rotor is near a position where commutation naturally occurs. This reverse voltage turns off all stator SCRs, but those receiving trigger pulses immediately turn back on when the commutating capacitor has discharged through the rotor winding, which action restores a substantial portion of the energy employed for commutation back to battery 38. This aspect of the operation is achieved by synchronized commutation circuit 119 shown in FIGS. 1 and 5, which provides or assists commutation during motor starting and during operation at relatively low rotor speeds. Circuit 119 automatically ceases said assistance at speeds above approximately 60 rpm.

Referring to FIG. 1, it will be noted that one input to commutation circuit 119 is a bus 128 which is common to all of trigger assemblies 101 through 108. Another input to circuit 119 is provided by line 126 from the positive voltage terminal of a DC-to-DC power supply 125. One output of circuit 119 is connected to the ungrounded side of rotor 20 at line 99, and another output from said circuit is connected to stator power input line 39.

As shown in FIG. 3, bus 128 connects to the cathode of a diode 223 whose anode is connected to the collector of transistor 215 in typical trigger assembly 102. As described previously, trigger assemblies 101 through 108 are identical. The outputs of the transistors 215 in the several trigger assemblies are coupled to bus 128 by the diodes 223 in said assemblies, and successively command operation of commutation circuit 119 only at the beginning of conduction of each successive pair of stator SCRs for reasons which will be discussed hereinafter.

FIG. 5 is a schematic diagram of synchronized commutation circuit 119. Functionally speaking, circuit 119 comprises a commutation command switch generally designated 150, a mono-stable multivibrator (generally designated 151) which serves to generate an intentionally delayed commutation trigger below a particular rotor rpm and no commutation trigger above said particular rpm, an SCR gate trigger amplifier generally designated 152, and stator SCR commutation means, generally designated 153, which is selectively triggered by action of monostable multivibrator 151.

Familiarization with the specific nature of the signals present at the collector of transistor 215 in its capacity as an inhibit command switch will aid in understanding the rpm responsive operation of commutation circuit 119 which, as stated above, is also connected to the collector of transistor 215 by diode 223.

Referring again to FIG. 3, the components connected to the emitter of transistor 215 comprise resistor 212 which is connected in series between the positive side of power supply 38 and said emitter electrode, and a resistor 214 and capacitor 213 connected in parallel with one another from said emitter to ground. When transistor 215 is nonconducting, capacitor 213 charges to a peak value determined by voltage divider action of resistors 212 and 214. Assume now that the power supply voltage is, for example, 50 vdc and that all resistors in trigger assembly 102 are of the same value. Under this condition, capacitor 213 will charge to 25 vdc. As discussed previously, the collector of transistor 215 connects via line 102a to the input of a trigger amplifier inhibit switch (exemplified by transistor 217 on FIG. 3), and there is a resistor 219 which connects to ground and a resistor 218 which may conduct positive voltage to ground through the base emitter junction of transistor 217.

Since the junction of resistors 218 and 219 is connected to the collector of transistor 215 via line 102a, let us now consider the nature of the signals that will appear at the collector of transistor 215 when assembly 102 generates SCR triggers. As discussed previously, transistor 215 responds to pulses coupled to its base electrode from transistor 209 by resistor 216, and transistor 209 develops an SCR trigger pulse with each positive alternation of oscillator 100 throughout the period of time that parallel resonance is induced by laminations 109 in coil 110. This SCR pulse production by each trigger assembly occurs for approximately 22.5° of rotor rotation.

When the first SCR trigger pulse appears at the collector of transistor 209 at the beginning of this 22.5° arc, transistor 215 is switched on and the junction of resistors 212 and 214 and capacitor 213 will be connected through the emitter collector junction of transistor 215 to the junction of resistors 218 and 219 and capacitor 220. One end of each of resistors 214 and 219 is connected to ground and resistor 218 is grounded through the base emitter junction of transistor 217. When transistor 215 conducts, the other end of resistor 214 becomes connected to line 102a which, in turn, connects through interconnecting line 224 and line 103a to the other ends of resistors 219 and 218 resulting in the parallel connection of these resistors. Line 224 is shown as a broken line since it actually represents a connection between adjacent trigger amplifiers 102 and 101, and is shown in this manner for descriptive purposes only. Thus, at the moment of turn on, capacitor 213 begins discharging from the (previously assumed) 25 v peak toward a divided lower voltage which results from paralleling resistors 218 and 219 with 214. By design choice, the RC time constants of capacitor 213 and the associated resistors are such that during the short SCR pulse duration (approximately 25 microseconds), capacitor 213 can not completely discharge to this new lower voltage before transistor 215 is again cut off. Thus, several SCR trigger pulses must occur in succession before the voltage charge of capacitor 213 is reduced to the lower voltage caused by the additional voltage dividing action of resistors 218 and 219.

The specific nature of the signals appearing at the collector of transistor 215 when assembly 102 is activated by the passage of laminations 109 may now be summarized. Said signals consist of a series of pulses, the first of which equals the initial charge of capacitor 213, with each succeeding pulse being of lesser amplitude until the peak voltage on capacitor 213 becomes equal to the increased voltage dividing action introduced during moments of transistor 215 conduction. In other words, the amplitude of the pulse train decays exponentially during the first several pulses and then remains at a new lower level for the remainder of the 22.5° rotation. Since assembly 102 is inoperative for the next 157.5° capacitor 213 has time to recharge to its original peak voltage and, therefore, to duplicate this behavior each time assembly 102 is made operative. As the rotor rotates, the signal on bus 128 consists of a series of groups of pulses identical to those just described for assembly 102, that is, one group for each trigger assembly.

Referring again to FIG. 5, bus 128 is connected to the cathode of zener diode 130, the anode of which connects through resistor 129 to the junction of resistor 132, capacitor 131 and the base of transistor 133. The zener (conduction) voltage of diode 130 is selected to reject the lower amplitude pulses present during each 22.5° output from trigger assemblies 101 through 108. Thus, only the first two or three pulses at the beginning of said 22.5° of rotor rotation are coupled by diode 130 to the base of transistor 133. Resistor 132, one side of which is grounded, holds transistor 133 cut off in the absence of said higher amplitude pulses coupled by zener diode 130.

The action of capacitor 131 and transistor 133 will be explained in connection with the operation of multivibrator 151, which comprises transistors 136 and 143 interconnected with a plurality of resistors and capacitors in a known monostable multivibrator configuration. In the absence of other controlling signals, the monostable multivibrator 151 assumes the following condition: transistor 136 conducts due to forward bias coupled from the power supply to its base by resistor 138. The junction of resistors 137, 139 and capacitor 131 at transistor 136's collector are, therefore, near ground potential. The base of transistor 143 is coupled through resistor 139 to the collector of transistor 136. Thus, when transistor 136 is conducting, transistor 143 is held in cutoff by resistor 139.

Consider now the action of multivibrator 151 when the signals appearing on bus 128 exceed the zener voltage of diode 130. When diode 130 couples a signal of more than approximately 0.6 vdc to the base of transistor 133, transistor 133 conducts and its collector, which is connected to the base of transistor 136, is clamped to near ground potential. Transistor 136, therefore, ceases conduction at that moment and its collector rapidly rises toward the positive potential of the power supply. This positive going voltage at the collector of transistor 136 is coupled by capacitor 131 to the base of transistor 133 and, being in the nature of positive feedback, accelerates the switching action of both transistor 133 and 136. At the same time, transistor 143 is rapidly driven into saturation by the forward bias coupled from power supply positive through resistors 137 and 139, while capacitor 134 is discharged to ground potential through the collector-emitter junction of transistor 133.

As previously mentioned, zener diode 130 couples only the first two or three pulses at the beginning of each trigger assembly's 22.5° conduction period to the base of transistor 133. Thus, within a few hundred microseconds after the first pulse, transistor 133, receiving no other pulses from diode 130, ceases conduction. When transistor 133 cuts off, capacitor 134 connected to the base of transistor 136 and to the positive side of the power supply by resistor 138 begins charging towards a positive voltage established by voltage divider action of resistors 138 and 135. Ultimately, the voltage across capacitor 134 reaches approximately 0.6 vdc at which moment transistor 136 again begins conduction, thereby removing the forward bias to transistor 143. As transistor 143 decreases conduction, its collector voltage begins rising towards the power supply positive potential due to resistor 141. The positive feedback of capacitor 140 accelerates the switching process with result that the positive voltage at the collector of transistor 143 increases rapidly. This positive going voltage pulse is coupled by capacitor 142 to transistor 145 in gate trigger amplifier 152 and serves as a commutation command trigger of a few (approximately 50) microseconds duration for SCR 121.

This action of commutation command switch 150 and commutation delay monostable 151 is repeated as each trigger assembly is activated by rotor rotation only when the time it takes the rotor to travel 22.5° is longer than the delay time of monostable 151. As the motor accelerates, a speed is ultimately reached where capacitor 134 is discharged by conduction of transistor 133 before transistor 136 can turn on. From this speed upward, monostable 151 is inoperative because transistor 136 is thus prevented from ever conducting while transistor 143 remains conducting and commutation assistance automatically stops.

The operation of monostable multivibrator 151 serves two purposes:

(1) The automatic stopping of commutation trigger generation above a particular rpm eliminates the need for special rpm responsive means to stop commutation assistance above a particular speed; and (2) The delayed generation of commutation command triggers after turn on of an SCR trigger assembly provides commutation assistance near rotor positions where self-commutation of stator SCR pairs naturally occurs.

More particularly, in regard to the rotor position of self-commutation, it has been determined that self-commutation naturally occurs when the rotor has travelled approximately 5.5° after a succeeding pair of SCRs has been triggered into conduction. Forced commutation by circuit means 153 is more efficiently accomplished at speeds below 50 rpm when activated near a natural rotor position of self-commutation than, for example, at the rotor position where a succeeding SCR pair is first triggered on. Further, it has been determined that selecting a delay time for operation of monostable multivibrator 151 that corresponds to a rotor movement of 5.5° at 15 rpm provides reliable motor starting and efficient low speed operation at maximum rated motor loads. Thus, the natural action of monostable multivibrator 151 activates commutation by circuit 153 below a particular (selectable) rpm, and the generation of commutation command triggers which are delayed a particular time after a succeeding pair of stator SCRs has been turned on. The foregoing actions provide automatic turn on and off of commutation assistance with efficient very low speed motor operation and reliable starting at any rotor position and under any load condition.

SCR gate trigger amplifier 152 converts its voltage pulse input, received from multivibrator 151, to a current pulse suitable for triggering SCR 121 of commutation circuit 153.

Commutation circuit 153 consists of SCR 121, resistor 123 and capacitor 122. Capacitor 122 has one terminal connected to line 39, the main power input to the stator, and its other terminal connects to the junction of resistor 123 (the other side of which connects to line 126, the high voltage terminal of power supply 125) and the anode of SCR 121 whose cathode connects to line 99 (the junction between the stator and rotor windings).

Assume SCR 121 is nonconducting and motor starting power is applied to line 39 via rheostat 115. Capacitor 122 charges through resistor 123 with the result that the voltage at its terminal, which is connected to the junction of resistor 123 and the anode of SCR 121, becomes substantially more positive than the voltage input to the stator on line 39. The motor starting power applied to line 39 causes the rotor to begin to rotate, which action leads to a next trigger assembly being activated by laminations 109. When this next trigger assembly first begins producing stator SCR triggers, operation of synchronized commutation means 119 is initiated as described above. After the selected time delay of monostable multivibrator 151, a suitable SCR current trigger pulse is coupled to the gate electrode of SCR 121 via line 124, the output of trigger amplifier 152. Upon receipt of said trigger pulse, SCR 121 turns on and the substantially high positive voltage side of capacitor 122 is connected to line 99, the junction of the rotor and stator windings. By this action, the voltage across the stator SCRs is reversed, that is, the cathodes of the still conducting SCR pair which are no longer receiving triggers, as well as the pair being triggered, are raised to a high positive voltage with respect to their anodes. This condition continues until the charge on capacitor 122 is equalized by discharge through rotor winding 20 to ground, rheostat 115 and battery 38 in a charging direction. Under this reverse voltage condition, the stator SCRs are commutated off; however, the SCR pair receiving triggers immediately turn back on while the previous pair, no longer receiving triggers, remain off. The rotor thus continues to rotate, SCR 121 self-commutates when capacitor 122 has discharged and, with SCR 121 off, capacitor 122 again charges toward the high voltage present on line 126. This commutation action cycle is repeated as each succeeding trigger assembly is activated until the rotor accelerates to a speed of approximately 60 rpm at which time commutation command triggers cease being generated by block 151 for the reason previously explained. Thus, during motor start, or any time rotor speed decreases below 60 rpm, commutation assistance is automatically provided by synchronized commutation circuit 119.

As discussed in Parker U.S. Pat. No. 4,095,148, rotor 36 may be constructed using permanent magnets instead of electromagnets as shown on FIG. 1. If rotor 36 is of permanent magnet construction, an inductor 129 should preferably be connected between line 40 and line 99 as shown by broken line 99a in FIG. 1. Optional inductor 129 would then serve as a suitable impedance, in place of electromagnetic rotor winding 20, which has sufficient inductance for operation of commutation circuit 119 described previously. For purposes of standardization, inductor 129 can be provided in line 40 as shown, but with a jumper 40a across said inductor, to render it inoperative when the rotor 20 has adequate inductance. The same optional inductor may also be employed if the impedance of a wound rotor is found insufficient to assist commutation, in which case dotted jumper 40a would be omitted.

While we have thus described preferred embodiments of the present invention, many variations will be apparent to those skilled in the art. It must, therefore, be understood that the foregoing description is intended to be illustrative only and is not limitative of the present invention, and all such variations and modifications as are in accord with the principles described are meant to fall within the scope of the appended claims.

Having thus described our invention, we claim:

1. In a motor of the type comprising a stator consisting of a plurality of coils connected in series with one another in a closed loop configuration, means connecting the junction between adjacent pairs of said coils to diametrically opposed ones of said junctions in said closed loop coil configuration, a plurality of pairs of oppositely poled gate controlled solid state rectifiers connected respectively to the junctions of different adjacent pairs of said coils for selectively conducting current into and out of said stator coil junctions, a current source for energizing each of said pairs of rectifiers, a rotor mounted for rotation adjacent said stator, and means including a distributor driven by said rotor for energizing the gate electrodes of different ones of said rectifiers in sequence thereby to produce a plurality of stator poles which are angularly displaced from the rotor poles and which stator poles shift in position about said closed loop coil configuration with rotation of said rotor, the improvement comprising rpm responsive electronic switch means responsive to particular rotor speeds, control means responsive to the operating state of said electronic switch means for controlling the conduction of said rectifiers to effect a starting mode of operation when said rotor is rotating below a predetermined speed and to effect a running mode of operation different from said starting mode when said rotor is rotating above a different predetermined speed, said means for energizing the gate electrodes of said rectifiers in sequence comprising a plurality of induction coils spaced from one another along an arcuate path, means connected to said coils to provide a plurality of frequency selective attenuator circuits, said distributor comprising a magnetic element mounted for rotation with said rotor for movement along an arcuate path past said coils to vary the inductances of said coils in sequence thereby to vary the resonant frequencies and thereby the attenuation of said frequency selective circuits in sequence, and oscillator means coupled to said plurality of frequency selective attenuator circuits, said oscillator means being operable to produce at least two different frequencies and having means responsive to said electronic switch means for supplying a signal at one of said output frequencies to said frequency selective circuits in said starting mode and for supplying a signal at another of said output frequencies to said circuits in said running mode.

2. The motor of claim 1 wherein the parameter values of said frequency selective attenuator circuits and said output frequencies of said oscillator means are so chosen that, when said magnetic element is remote from the coil in a given one of said circuits, said given circuit is near resonance at either of said two output frequencies.

3. The motor of claim 2 wherein said parameter values and output frequencies are so chosen that, when said magnetic element partially overlaps the coil in said given one of said frequency selective attenuator circuits said given frequency selective circuit is resonant at one of said output frequencies and when said magnetic element fully overlaps said coil said given frequency selective circuit is resonant at the other of said output frequencies.

4. The motor of claim 1 wherein said frequency selective attenuator circuits and said output frequencies of said oscillator are so chosen that the state of resonance of each circuit is near a state of active series resonance when said magnetic element is remote from said coil in said circuit at either one of said two output frequencies, and is in a state of active parallel resonance when said magnetic element at least partially overlaps said coil at a particular one of said output frequencies.

5. The motor of claim 1 wherein each of said frequency selective attenuator circuits is so constructed that its frequency bandpass varies in dependence upon the position of said magnetic element relative to the said coil in said circuit.

6. The motor of claim 5 wherein each of said frequency selective attenuator circuits is so constructed that its frequency bandpass is broadened when said element is remote from said coil, and is narrowed when said element at least partially overlaps said coil.

7. The motor of claim 1 including means for continuously maintaining the reactive elements of each of said frequency selective attenuator circuits in a signal driven, active state of resonance at each frequency output of said oscillator and for all positions of said magnetic element relative to the said coil in said circuit.

8. The motor of claim 1 wherein said solid state rectifiers comprise silicon controlled rectifiers.

9. The motor of claim 1 wherein said means connected to said coils comprises capacitor means, whereby the frequency selective portions of said frequency selective attenuator circuits constitute LC circuits.

10. The motor of claim 9 including resistor means connected to said capacitor means, whereby said frequency selective attenuator circuits constitute LRC circuits.

11. The motor of claim 9 wherein each of said LC circuits comprises a portion of an associated trigger assembly, said trigger assemblies being operable to produce output signals in sequence for controlling in sequence the conduction of different ones of said rectifiers respectively, and means responsive to the production of an output signal from a given one of said trigger assemblies for inhibiting the production of an output signal from the preceding sequentially operable one of said trigger assemblies.

12. The motor of claim 1 including commutation assisting means for providing forced commutation of said rectifiers below a particular speed of rotation of said rotor, and means for rendering said commutation assisting means inoperative when the speed of said rotor exceeds said particular speed to permit self-commutation of said rectifiers at speeds above said particular speed.

13. The motor of claim 12 wherein said commutation assistance means includes means for delaying said forced commutation by a number of degrees of rotor rotation after said stator coils are first energized when the speed of said rotor is below a particular speed.

14. The motor of claim 13 wherein said means for delaying forced commutation of said rectifiers comprises time delay means, and means for activating said time delay means when each of said stator coils is first energized at the beginning of the period of energization of said stator coil.

15. The motor of claim 14 wherein said means for rendering said commutation assistance means inoperative is responsive to the operation of said time delay means.

16. The motor of claim 1 wherein said means for energizing said gate electrodes comprises a plurality of trigger assemblies, each of said trigger assemblies comprising one of said frequency selective circuits connected to the input of a Schmitt trigger circuit, a gate trigger amplifier connected to the output of said Schmitt trigger circuit, and means coupling the output of said gate trigger amplifier to the gate electrodes of selected ones of said rectifiers.

17. The motor of claim 16 wherein each of said trigger assemblies includes a trigger amplifier inhibit switch coupled to the gate trigger amplifier in said assembly, said amplifier inhibit switch being operative to inhibit an output from said gate trigger amplifier in response to a control signal generated by another one of said trigger assemblies.

18. The motor of claim 17 wherein each of said trigger assemblies includes an inhibit command switch responsive to an output signal from said gate trigger amplifier in said assembly for generating said control signal.

19. The motor of claim 1 including means operative in said starting mode of operation to produce a timing advance in the rotor position relative to the stator at which the energization of said rectifiers occurs as compared to the position of the rotor at which said rectifiers are energized in said running mode of operation.

20. A motor comprising a rotor, a stator consisting of a plurality of coils interconnected to one another, commutation assistance means, a plurality of gate controlled solid state rectifiers responsive to said commutation assistance means below a particular rpm of said rotor and operative in a self-commutation mode above said rpm, said rectifiers being connected to the junctions of said stator coils for selectively conducting current into and out of said stator coil junctions, energizing means including a distributor driven by said rotor for energizing the gate electrodes of different ones of said rectifiers in a predetermined sequence to produce a plurality of stator poles which are angularly displaced from the poles of said rotor and which shift in position as said rotor rotates, said energizing means including a plurality of trigger assemblies which are connected respectively to different ones of said rectifiers, each of said trigger assemblies including a pick-up coil, said distributor comprising an element of magnetic material which is moved in sequence past the pick-up coils in said plurality of trigger assemblies as said rotor rotates, each of said trigger assemblies further including capacitor means coupled to the pick-up coil in said assembly to provide an LC frequency sensitive circuit whose state of resonance and resonance frequency varies in dependence of the position of said magnetic element relative to said coil, oscillator means coupled to the frequency sensitive circuits in all of said trigger assemblies, said oscillator means being operative to produce at least two different output frequencies, control means responsive to the speed of rotation of said rotor for selectively changing the output frequency of said oscillator means thereby to vary the rotor position at which a particular amplitude of the output signal is produced by each of said frequency sensitive circuits in joint dependence upon the speed of rotation of said rotor, the particular frequency of said oscillator and the position of said magnetic element relative to each of said pick-up coils, and circuit means responsive to a particular amplitude threshold of said output signal in each of said trigger assemblies for controlling the energization of the gate electrodes of the solid state rectifiers associated with said trigger assembly.

21. The motor of claim 20 including means responsive to the energization of the gate electrodes of the rectifiers associated with one of said trigger assemblies for preventing the energization of the gate electrodes of the rectifiers associated with the others of said trigger assemblies.

22. The motor of claim 20 wherein said control means is operative to cause said oscillator means to produce an output signal at one frequency when said motor is stopped, and to cause said oscillator means to produce an output signal at a different frequency when said motor accelerates to a particular rpm.

23. The motor of claim 22 wherein said control means comprises rpm responsive electronic switch means activated by rpm related signals coupled from said commutation assistance means and operative to shift the output frequency of said oscillator means at particular rpms.

24. The control means of claim 23 wherein said switch means becomes operative to shift the output frequency of said oscillator means at a particular speed of rotation of said rotor when the motor is accelerating and at a different speed of rotation of said rotor when said motor is decelerating.

25. A DC motor comprising a stator consisting of a plurality of coils interconnected to one another, a plurality of gate controlled solid state rectifiers connected to the junctions of said coils for selectively conducting current into and out of said stator coil junctions, a rotor mounted for rotation adjacent said stator, energizing means including a distributor driven by said rotor for energizing the gate electrodes of different ones of said rectifiers in a predetermined sequence to produce a plurality of stator poles which are angularly displaced from the poles of said rotor and which shift in position as said rotor rotates, said energizing means includes a plurality of trigger assemblies which are connected respectively to different ones of said rectifiers, and commutation assisting means coupled to said trigger assemblies and responsive to signals provided by said distributor for effecting forced commutation of said rectifiers below a particular speed of rotation of said rotor, said commutation assisting means being inoperative when the speed of said rotor exceeds said particular speed thereby to permit self-commutation of said rectifiers at speeds above said particular speed.

26. The DC motor of claim 25 wherein each of said trigger assemblies includes a pick-up coil, said distributor comprising an element of magnetic material which is moved in sequence past the pick-up coils in said plurality of trigger assemblies as said rotor rotates.

27. The DC motor of claim 26 wherein each of said trigger assemblies further includes capacitor means coupled to the pick-up coil in said assembly to provide an LC frequency sensitive circuit whose resonance frequency varies in dependence of the position of said magnetic element relative to said coil, oscillator means coupled to the frequency sensitive circuits in all of said trigger assemblies, said oscillator means being operative to produce at least two different output frequencies, and electronic switch means for selectively changing the output frequency of said oscillator means at different predetermined speeds of rotation of said rotor.

28. The DC motor of claim 27 wherein each of said LC frequency sensitive circuits has a frequency bandwidth which varies in dependence upon the mechanical position of said magnetic element relative to the said coil in said circuit thereby to substantially attenuate all output signal frequencies of said oscillator means coupled thereto when said magnetic element is remote from said coil and to pass all said frequencies of said oscillator with little attenuation when said magnetic element is in proximity to said coil.

29. The DC motor of claim 25 wherein said energizing means includes a storage battery, said commutation assisting means being operative to return a substantial portion of the energy employed for said forced commutation back to said storage battery to charge said storage battery when said motor is operating below said particular speed of rotation.

30. The DC motor of claim 26 wherein said element of magnetic material is mounted for rotation with rotation of said rotor, the pick-up coils of said plurality of trigger assemblies being located along an arcuate path parallel to the path of rotary movement of said element of magnetic material, the spacing between said coils and the angular extent of said magnetic element being such that said magnetic element overlaps at least one of said coils at every angular position of said rotor.

31. The DC motor of claim 30 wherein said distributor comprises an armature coupled to said rotor for rotation with said rotor, said armature having two of said elements of magnetic material mounted thereon in diametrically opposed relation to one another, said pick-up coils being located along an arcuate path extending substantially 180° about the periphery of said armature.

32. A DC motor comprising a stator consisting of a plurality of coils interconnected to one another, a plurality of gate controlled solid state rectifiers connected to the junctions of said coils for selectively conducting current into and out of said stator coil junctions, a rotor mounted for rotation adjacent said stator, energizing means including a distributor driven by said rotor for energizing the gate electrodes of different ones of said rectifiers in a predetermined sequence to produce a plurality of stator poles which are angularly displaced from the poles of said rotor and which shift in position as said rotor rotates, said energizing means including a plurality of trigger assemblies which are connected respectively to different ones of said rectifiers, each of said trigger assemblies including a pick-up coil, said distributor comprising an element of magnetic material which is moved in sequence past the pick-up coils in said plurality of trigger assemblies as said rotor rotates, means coupled to the pick-up coil in each of said assemblies to provide a frequency sensitive attenuator circuit in said assembly whose state of resonance and resonance frequency varies in dependence of the position of said magnetic element relative to said coil, oscillator means coupled to the frequency sensitive attenuator circuits in all of said trigger assemblies, said oscillator means being operative to produce at least two different output frequencies, and control means responsive to the speed of rotation of said rotor for selectively changing the output frequency of said oscillator means.

33. The DC motor of claim 32 wherein said control means comprises rpm responsive electronic switch means.

34. The DC motor of claim 32 wherein said frequency sensitive attenuator circuits and said output frequencies of said oscillator are so chosen that each of said circuits is near a state of active series resonance at both of said two different output frequencies when said magnetic element is remote from the pick-up coil in said circuit, and is near a state of active parallel resonance at a particular one of said output frequencies when said magnetic element at least partially overlaps said pick-up coil.

35. A DC motor comprising a stator consisting of a plurality of coils connected to one another at particular junctions, a rotor mounted for rotation adjacent said stator, a contactless input power distributor operative to initiate rotation of said rotor and to energize said stator coils in predetermined sequence thereby to produce a plurality of stator poles which are angularly displaced from the poles of said rotor and which shift in position as said rotor rotates, said contactless distributor comprising an element of magnetic material driven by said rotor, a plurality of pick-up coils adjacent the path of movement of said magnetic element, a plurality of trigger assemblies, each of which includes one of said pick-up coils, for producing gate trigger signals, a plurality of gate controlled solid state rectifiers connected to said particular junctions of said stator coils for selectively conducting current into and out of said junctions in response to the said gate trigger signals supplied by said trigger assemblies, said rectifiers being operative to self-commutate in sequence as the rotor rotates, oscillator means coupled to the pick-up coils in said plurality of trigger assemblies, said pick-up coils being responsive to the output signal from said oscillator means and to said magnetic element to activate said trigger assemblies and thereby to energize said rectifiers when said magnetic element is in particular mechanical proximity to said coils, said oscillator means being operative to produce different output frequencies, control means responsive to the speed of rotation of said rotor for selectively changing the output frequency of said oscillator means, and frequency selective attenuator means in each of said trigger assemblies comprising capacitive and resistive elements connected to said pick-up coils, said frequency selective attenuator means being operative to electronically shift the particular mechanical position of said magnetic element relative to said pick-up coils respectively at which said rectifiers are energized by said trigger assemblies in response to a particular frequency output of said oscillator, thereby to non-mechanically advance and retard the position of said rotor relatives to said stator where said stator coils are energized by said rectifiers and to change the rotor/stator positional relationship where said self-commutation of said rectifiers naturally occurs.

* * * * *